May 21, 1968   R. G. PARRISH   3,384,531
FLATTENED ULTRA-MICROCELLULAR STRUCTURE AND
METHOD FOR MAKING SAME
Filed Nov. 27, 1963
FIG. 1
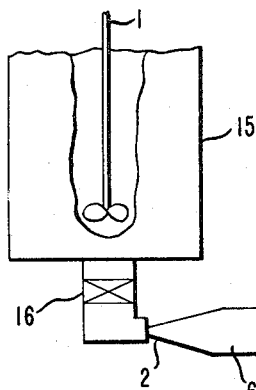
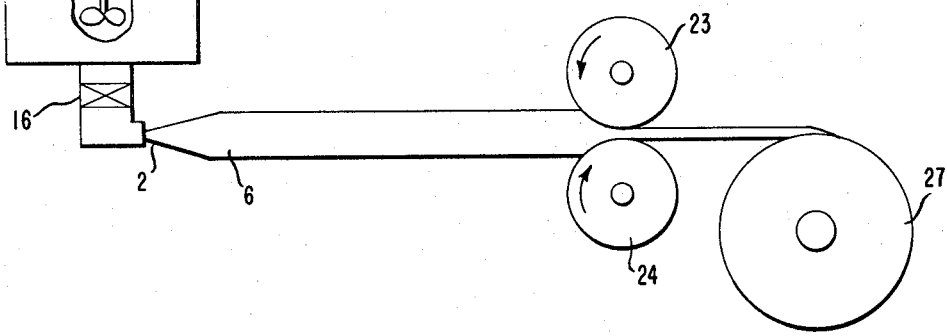
FIG. 2A
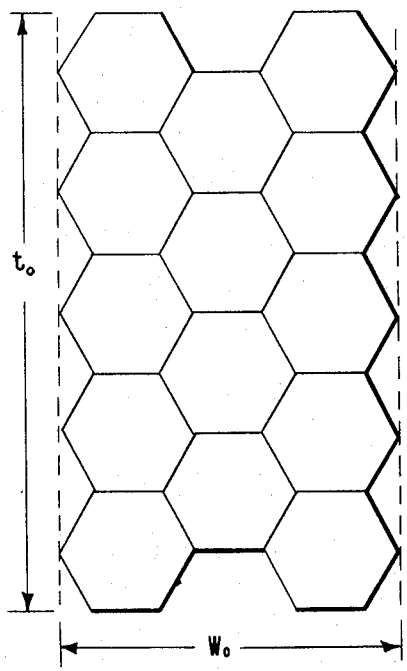
FIG. 2B
FIG. 2C
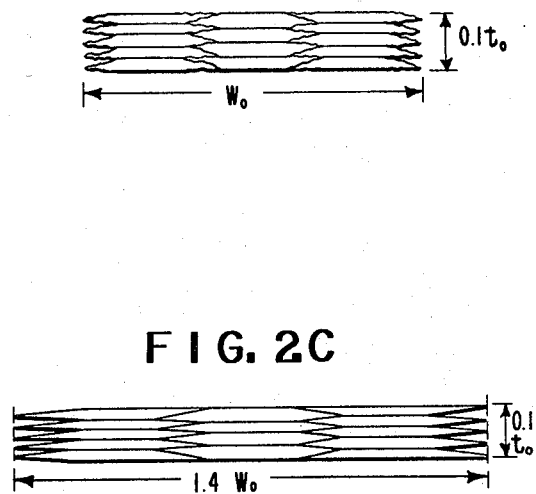
INVENTOR
ROBERT GUY PARRISH
BY Donald A. Hoes
ATTORNEY United States Patent Office 3,384,531
Patented May 21, 1968

3,384,531
FLATTENED ULTRA-MICROCELLULAR STRUCTURE AND METHOD FOR MAKING SAME
Robert Guy Parrish, Wilmington, Del., assignor to E. I. du Pont de Nemours and Company, Wilmington, Del., a corporation of Delaware
Continuation-in-part of application Ser. No. 157,820, Dec. 7, 1961. This application Nov. 27, 1963, Ser. No. 326,597
19 Claims. (Cl. 161—159)

ABSTRACT OF THE DISCLOSURE

Paper and semi-textile-like sheets of a crystalline hydrocarbon polymer composed of flattened polyhedral shaped cells possessing uniplanar orientation and being substantially aligned within the plane of the sheet. Process for the preparation of the above sheets by permanently compressing or stretching a crystalline ultramicrocellular sheet material composed of the hydrocarbon polymer (for example polyethylene and polypropylene).

---

This a continuation-in-part of application Serial No. 157,820, filed December 7, 1961, and now abandoned.

This invention relates to a synthetic paper material and related products. More specifically it relates to paper-like and semi-textile-like structures prepared from ultramicrocellular, crystalline polyhydrocarbon sheet material.

A major deficiency of cellulosic paper products is their water sensitivity, as evidenced by their poor wet strength and dimensional instability with changing humidity. Certain special treatments, such as resin impregnation or wax coating, have been used to mask this deficiency and permit construction of useable bags, towels, cartons, etc. In contrast, the polyhydrocarbon materials of this invention are notable for their water insensitivity, and thus sheet products of these materials do not require any special water proofing treatments. Unfortunately, this very feature generally leads to other problems when it is desired to print on polyhydrocarbon objects (e.g., films), and current practice is to subject these materials to a special treatment (for example, apply an ink receptive coating, buff or roughen the surface, or alter the surface through chemical reaction or high energy irradiation) to render the surface ink receptive. It is a special feature of the polyhydrocarbon sheets of this invention that they exhibit excellent ink receptivity directly as produced.

The products of the invention greatly excel corresponding cellulosic products in such properties as tensile and tear strength, toughness, and opacity at equal basic weight (or equal opacity at ⅓ to ¼ the basic weight). The lower densities of these products as compared with cellulosic papers result not only in a competitive raw material cost per item, but also economy on shipping charges per item as well. A further advantage of these polyhydrocarbon synthetic papers is their excellent dielectric properties which suits them uniquely for use in electrostatic photocopying processes as well as for insulating layers in electrical devices such as capacitors and the like.

It is an object of this invention to provide a polyhydrocarbon sheet material useful as a cellulosic paper substitute having high tensile strength, toughness, opacity, tear strength and low density and water sensitivity. It is a further object to provide such materials with ink receptive directly printable surfaces. Another object is to provide synthetic paper sheet materials with excellent dielectric properties by virtue of their polyhydrocarbon composition. Still another object is to provide semi-textile sheet materials. Other objects will appear hereinafter.

In accordance with this invention these objects are accomplished by effecting a substantial reduction in the thickness of a particular cellular sheet material, specifically a low density ultramicrocellular sheet structure comprising a crystalline polyhydrocarbon. By virtue of the reduction in thickness, a low density cellular material is converted into a paper-like or semi-textile-like product of significantly improved properties of tensile strength, toughness and, frequently, tear strength as well. Microscopic examination of the product reveals that the cellular nature of the original sheet structure is preserved essentially intact although individual cells will be observed as having been collapsed, flattened or otherwise distorted in shape. Techniques for effecting the reduction in thickness of the cellular sheet material include the use of mechanical compressive forces applied in a direction normal with respect to the plane of the sheet and the use of bilateral tension forces applied in a direction across the plane of the sheet.

The preparation of ultramicrocellular structures is described in copending U.S. application Serial No. 170,187, filed January 31, 1962, now U.S. Patent No. 3,227,664. The present invention utilizes as a starting material those ultramicrocellular structures which are extruded in the form of a low density sheet material comprising a crystalline polyhydrocarbon. As described in the aforementioned U.S. application, the ultramicrocellular structures are particularly unique owing to the polyhedral shaped structure of their cells, to the film-like character of the cell walls, and to the uniform texture and high degree of molecular orientation, i.e., uniplanar orientation, existing in those walls. Together these features serve to define a class of materials which, in comparison with prior art cellular structures, exhibit outstanding strength and resiliency properties, although fabricated at extremely low densities.

The ultramicrocellular structures to be employed as starting materials in accordance with the present invention can also be prepared by a modification of the extrusion procedures disclosed in Belgian Patent 568,524. The polyhydrocarbon-activating liquid solution is prepared at a concentration and temperature suitable for producing a cellular structure, for example as represented by a point in area B of FIGURE 10 or 11 of the Belgian patent. This solution is extruded through a slot or annular orifice from its high pressure region into a region of lower pressure in such a manner that at least $10^6$ bubble nuclei/cc. exist in the solution at the instant of extrusion. This may be accomplished in several ways, for example by dispersing a quantity of a porous solid bubble nucleation assisting material in the solution or by providing an adequate pressure drop across the extrusion orifice. The required pressure drop may be estimated from equations given in an article by L. Bernath, Industrial Engineering Chemistry, 44, p. 1310 (1952). The large volume increase just outside the extrusion slot or annulus, caused by the rapid generation of activating liquid vapor, generally leads to an expansion of the celluar sheet which cannot be geometrically accommodated without the formation of longitudinal folds. These may be minimized by employing well known blown film techniques with the annular die, or other techniques known in the art.

A detailed description will now be given of characteristics of the as-extruded ultramicrocellular structures which, in accordance with the present invention, are employed as starting materials for the production of paper-like and semi-textile-like products. To a large extent it is these characteristics which give rise to sheet products of unusual properties following compression or stretching to effect a reduction in thickness.

As regards the as-extruded ultramicrocellular structures, substantially all of the polymer is present as filmy elements whose thickness is less than 2 microns, preferably under 0.5 micron. The term "drained foam" is aptly descriptive of such ultramicrocellular structures. The thickness of a cell wall, bounded by intersections with other walls, does not ordinarily vary by more than ±30%. Adjacent walls frequently will have generally equal thickness values, such as within a factor of 3. The polymer in the cell walls exhibit uniform texture and uniplanar orientation. The apparent density of the ultramicrocellular products is between 0.5 and 0.005 g./cc. The number of cells per cc. is desirably at least $10^3$, although values of $10^5$ or greater are preferred. In general, the ultramicrocellular structures may be formed with densities in the range of 0.5 to 0.005 g./cc. As a suitable starting material for purposes of the present invention, however, they should have a density less than about 0.17 g./cc.

In the case of an as-extruded microcellular structure, the cell wall thickness can be determined by microscopic examination of cross sections. Thus 20–60 micron thick sections may be cut from a frozen sample with a razor blade. Large cell (>50 microns) samples are frozen directly in liquid nitrogen. Smaller celled samples are preferably "imbedded" in water containing a detergent, and then frozen and sectioned. The transverse dimension of one or more cells can also be readily measured by freezing and sectioning techniques. The cells are found to exhibit a general polyhedral shape, similar to the shape of the internal bubbles in a foam of soap suds. The average transverse dimension of the cells should be less than 1000 microns, preferably less than 300 microns, and the mutually perpendicular transverse dimensions of a single cell should not vary by more than a factor of three. The ratio of the cell volume to the cube of the wall thickness can be calculated and exceeds about 200. For very thin walled samples (<1 micron), the wall thickness is preferably measured with an interferometer microscope. A layer of the sample is peeled off by contact with "Scotch Tape." The layer is freed from the tape by immersion in chloroform and subsequently placed on the stage of the microscope for measurement.

The term "uniplanar orientation" employed with respect to the as-extruded ultramicrocellular structures may be fully understood from the following discussion. As will be described in greater detail in subsequent portions of the specification, the paper-like and semi-textile-like products of the present invention also possess uniplanar orientation. "Axial," "planar," and "uniplanar" indicate different types of molecular orientation of high polymeric materials. "Axial orientation" refers to the perfection with which the molecular chains in a sample are aligned with respect to a given direction, or axis, in the sample. For example, prior art filaments which have been drawn in one direction only generally exhibit an appreciable degree of axial orientation along the stretch direction. "Planar orientation" refers to the perfection with which the molecular chains are oriented parallel to a surface of the sample. "Uniplanar orientation" is a higher type of polymer orientation in that it refers to the perfection with which some specific crystalline plane (which must include the molecular chain) in each polymer crysallite is aligned parallel to the surface of the sample. Obviously, only crystalline polymers can exhibit uniplanar orientation. These three types of molecular orientation may occur singly or in combination; for example, a sample might simultaneously exhibit uniplanar and axial orientation.

Electron diffraction furnishes a convenient technique for observing the presence of uniplanar orientation. A single cell wall is placed perpendicular to the electron beam. Since the Bragg angle for electron diffraction is so small, only crystalline planes essentially parallel to the beam (perpendicular to the wall surface) will exhibit diffraction. If the sample does in fact have perfect uniplanar orientation, there is some crystallographic plane which occurs only parallel to the film surface and, therefore, will be unable to contribute to the diffraction pattern. Thus, the observed pattern will lack at least one of the equatorial diffractions normally observed for an axially oriented sample of the same polymer. If the degree of uniplanar orientation is somewhat less than perfect, there may be a few crystallites tilted far enough to contribute some intensity to the diffraction pattern, but at least one of the equatorial diffraction intensities will be appreciably less than normal. Thus, for the purpose of this invention, a sample is considered to have uniplanar orientation when at least one of the equatorial diffractions appears with less than one-half its normal relative intensity as determined on a standard which is a randomly oriented sample of the same polymer.

An alternative and occasionally more convenient technique for detecting the presence of uniplanar orientation in a sample is to observe the electron diffraction pattern as the plane of the sample is tilted with respect to the electron beam. (In case the sample also exhibits axial orientation, the tilt axis is preferably parallel to the orientation axis.) For uniplanar-oriented samples, first one crystallographic diffraction plane and then another will assume the position required for Bragg diffraction, so that first one and then another lateral diffraction will appear and then disappear as the sample rotation continues. The more perfect the degree of uniplanar orientation, the more sharply defined is the angle at which any particular diffraction appears. When a plot of diffraction intensity (corrected for sample thickness variation) vs. angle of sample tilt is prepared for any of the lateral diffractions, the distance in "degrees tilt" between points of half-maximum intensity may be readily determined. Only samples having uniplanar orientation will have half-maximum intensity points separated by 90° or less, and this will serve as an alternate criterion for the presence of uniplanar orientation.

One precaution must be observed in making this measurement. If the sample field examined by the electron beam is stopped down so far that it "sees" only one crystallite at a time, it will always be possible, even for a randomly oriented sample, to find some crystallite oriented parallel to the sample surface which would, of course, give an "uniplanar orientation" diffraction pattern. In order to insure that the "uniplanar orientation" pertains to the whole film element and not just to one crystallite, the measurement should be made examining a field of at least 100 square microns area, which is large enough to include the contributions from many crystallites simultaneously. Other techniques of measuring uniplanar orientation and their co-relation with electron diffraction measurements are described in the J. Pol. Sci., 31, 335 (1958), in an article by R. S. Stein.

The term "uniform texture" applied to the polymer in the cell walls of an as-extruded ultramicrocellular means that the orientation, density, and thickness of the polymer is substantially uniform over the whole area of a cell wall, examined with a resolution of approximately ½ micron. This is best determined by observing the optical birefringence in the plane of a wall of a cell removed from the sample. For ultramicrocellular samples with a net over-all axial orientation, the individual cell walls will normally exhibit an axial orientation in addition to the required uniplanar orientation. In the birefringence test, such products of the present invention will show a uniform extinction over the whole area of the cell wall. Samples with no net axial orientation must show a uniform lack of birefringence over their whole area rather than numerous small patches of orientation with each patch oriented at random with respect to the others. Lacy or cobweb-like cell walls, of course, do not have uniform birefringence over the whole area of a cell wall, and such products are readily distinguished from the uniform textured products of this invention. After mechanically collapsing an as-extruded ultramicrocellular sheet in accordance with the invention, the cell walls may no longer exhibit uniform texture.

The present invention utilizes as a starting material an as-extruded ultramicrocellular sheet structure which has been prepared from a polyhydrocarbon, e.g., a high molecular weight hydrocarbon polymer. Since only crystallizable or crystalline polymers are suitable in the process of preparing the ultramicrocellular sheets, for the purposes of this invention linear polyethylene, polypropylene and crystallizable copolymers or graft polymers of ethylene and propylene with other monomers such as 1-olefins of up to ten carbon atoms are preferred. Blends of such polymers are also suitable. Other operable polymers include poly(3-methyl butene), poly(4-methyl pentene), isotactic polystyrene, and the like. Suitable activating liquids are described in the aforementioned U.S. application 170,187 and in Belgian Patent 568,524. Among those most preferred are hexane, pentane, butane, methylene chloride, and trichlorofluoromethane. In order to take full advantage of the process and produce products with the highest tensile properties, it is preferred to use polymers of low melt index.

The as-extruded ultramicrocellular sheet structures will consist essentially of polyhedral shaped cells including both closed cells and open cells (tubular structures of varying length arranged in a sponge-like structure) in any proportion, depending on the choice of operating conditions. There may also occur a minor amount of fibrillar material, but the as-extruded ultramicrocellular sheet is a coherent unitary structure.

According to the present invention, the low density as-extruded sheets are mechanically treated to permanently reduce their thickness and to increase their density. It is a surprising feature of this invention that such mechanical collapsing does not destroy and render worthless the cellular sheet structure, but rather converts it into a different form, specifically into paper-like or semi-textile-like products. In addition, it has been found that pressing increases the tensile strength of the sheets. A tensile above 5 lb./in./oz./yd.$^2$ in the machine direction and above 1.5 lb./in./oz./yd.$^2$ in the transverse or cross direction is readily attained. The work-to-break value in the machine direction which is a measure of the toughness of the sheets, determined by the area under the stress-strain curve is markedly improved. In general, the tear strength is also improved in the machine direction.

The collapsed, densified sheet prepared as described hereinafter, may be described as an integral structure of a crystalline hydrocarbon polymer comprising flattened polyhedral cells whose walls have an average film thickness below 2 microns and are aligned substantially in the plane of the sheet. The walls of the individual cells possess uniplanar orientation and the smallest cellular dimension, which would correspond to the height of a flattened cell is below 50 microns, preferably below 10 microns. The second largest dimension of the polyhedral cells is on the average between 1 and 3000 microns, but at least 3 times the height.

The measurement of the wall film thickness may be made with an interferometer microscope at 400 magnifications. In one technique a layer of the sheet is peeled off by contact with "Scotch Tape." The layer is freed from the tape by immersion in chloroform and placed on the stage of the microscope for measurement. The second largest cellular dimension is measured on a polarizing microscope at 300×, the dimension being the distance between the ridges representing side walls or remnants thereof on a layer of the sheet obtained as above. The sample is immersed in oil of about 1.5 refractive index for this determination.

The height of the flattened cell is calculated by the formula $$\text{Height} = \left(\frac{2.5}{d} - 1\right)_t$$

where $d$ is the density of the sheet in grams/cc. determined from the basis weight and sheet thickness, and $t$ is the wall film thickness determined as described above. The fact that the cellular walls are substantially aligned in the plane of the sheet is evidenced by the positive birefringence in a plane perpendicular to the surface of the sample, i.e., the index of refraction measured parallel to the surface of the sheet is greater than the index of refraction measured perpendicular to the surface of the sheet. This determination is made in the manner described by Chamot and Mason "Handbook of Chemical Microscopy," vol. 1. A 10 micron section of the sheet in ice is cut as the specimen with a freezing microtome. The sign of the birefringence is measured with a low power polarizing microscope and a first order red plate. The magnification employed should preferably be too low to distinguish the individual cell walls, and the positive birefringence must apply to the section as a whole, not just the surface layers of the sample. These 10 micron sections may often conveniently be used for the interferometric determination of wall thickness, provided the walls are placed parallel to the plane of the sample by compressing the section.

Two somewhat different mechanical treatments are particularly suitable for converting the as-extruded ultramicrocellular sheets to the collapsed products of this invention. One such treatment involves applying mechanical forces in a direction normal to the plane or faces of the sheets. The sheets are thus mechanically compressed beyond their yield point with permant reductions in thickness ranging from factor of ⅓ to ⅟₅₀ or less. The yield point is achieved when the thickness reduction is of sufficient magnitude that full recovery of the original thickness is not experienced upon release of the mechanical forces. If required, any longitudinal folds in the extruded sheets may be removed prior to pressing by mechanically spreading or stretching th esheet transversely. The pressing may be performed continuously, as by calender rolls or two juxtaposed moving belts, or discontinuously as by any type of hydraulic press. Although the sheets are compressed under sufficient pressure that they permanently remain deformed, the pressure must not be so high as to fuse the cellular structure into a film like product with total loss of the cellular character and unique polymer orientation of the starting sheet. By stopping just short of this point it is possible to prepare a translucent or transparent glassine-like product with superior tensile properties, water vapor impermeability and grease resistance. Pressures from about 10 to 10,000 p.s.i. or greater are ordinarily employed. A reasonable pressure for preparing the paper-like products of this invention has been determined to be 500 p.s.i., although both higher and lower pressures are useable. The semi-textile-like materials are ordinarily prepared at lower pressures, such as 10 p.s.i. The duration of application of pressure is not particularly critical, and may range from a fraction of a second to several minutes or more. The pressing temperature may range from room temperature or lower up to the crystalline melting point of the polymer. Naturally, the variables of maximum pressure, pressing temperature and duration of pressure application are all inter-related, and any one may be adjusted toward some desired value by suitable change of the other two. It is, of course, quite feasible to impart textured patterns or designs to these products by using embosing rolls or platens for pressing poeration.

The use of calender rolls to mechanically compress an as-extruded ultramicrocellular sheet structure is schematically illustrated in FIGURE 1. As shown therein an autoclave or other suitable vessel 15 equipped with agitator 1, discharge valve 16, and slot shaped extrusion orifice 2 is charged with a crystalline hydrocarbon polymer and activating liquid and brought up to the required temperature and pressure. Valve 16 is then opened and extrudate 6 in sheet form (side view or thickness shown) is discharged from the orifice. The thickness dimension of the sheet quickly increases many fold as the activating liquid vaporizes. The as-extruded cellular sheet is then led to any suitable means which will compress the sheet beyond its yield point. A pair of heated calender rolls 23 and 24 is illustrated in the drawing for achieving this objective. After permanent reduction in thickness, the sheet is collected on windup roll 27.

A second mechanical treatment for achieving a permanent thickness reduction in the as-extruded cellular sheets comprises bilaterally stretching the sheets, as in a drawing operation. The extent and duration of this stretching must be chosen to produce a permanent reduction in thickness by at least a factor of three. A draw ratio of 2X or more will frequently suffice. The stretching may be carried out continuously (e.g., "on the run") in either the machine direction, transverse direction or a combination of both, or the stretching operation may be performed on discrete pieces of the as-extruded cellular sheet. Such lateral stretching operations may actually elongate the individual cell walls, so that whereas the transverse dimensions of the cells of the as-extruded samples may range up to 1000 microns, the cells of the stretch-collapsed samples may range up to 3000 microns in width. As is the case with mechanical compressing technique, the sheet temperature may range from room temperature or lower up to the crystalline melting point of the polymer.

A preferred variant of this technique consists of stretching the sheets to at least about 150% of their initial larger dimensions in two mutually perpendicular directions. This modest degree of stretching does not appreciably further draw and orient the polymer in the filmy cell walls, but serves simply to collapse the structure. It may be visualized as merely increasing the distance between the opposite edges of the polyhedral cells to cause internal adjacent faces to come into contact by collapse of the structure. Products prepared in this way thus have both width and length increased to at least about 150% of that of the original as-extruded sheet, whereas the area of the sheets compresesed by applying force normal to their surface remains unchanged. Although products collapsed in either way have their film-like cell walls substantially aligned in the plane of the sheet, as described earlier, there are certain differences between the two. In the compressed products, for example, the cell walls originally aligned approximately perpendicular to the sample surface are crumpled and folded during the collapsing process, as indicated scematically in FIGURE 2B, while corresponding walls in the stretched products have been tilted around into the plane of the sheet, and remain extended as indicated schematically in FIGURE 2C. This difference in structure gives rise to the following features, making the stretched samples preferred for certain uses: the stretched products have a higher luster, higher initial modulus and tensile strength and a higher tensile yield strength. Furthermore, although the stretched and the compressed sheet products are both opaque (due to multiple reflection and scattering of light at the interfaces of their residual cellular structure), both can be made transparent by applying additional pressure sufficient to fully collapse their cellular structure and bring the cell walls into intimate contact. However, the stretched sheets are much more readily pressure-clarified than the compressed sheets.

It has been discovered that the tensile properties of these products are strongly directional dependent. For example, the tensile strength in the machine direction may be five times that in the transverse direction. It is thought that this feature is related to weak longitudinal channels in the cellular sheets produced during the extrusion operation.

Products with balanced properties may readily be produced by cross lapping and laminating the single sheet products. Ordinarily, in a two-ply cross-lap, the two sheets will be placed so that the machine directions are at right angles, or at an angle of at least 30°. It is most surprising to observe that such cross-lapped sheets exhibit tremendous increases in tear strength, sometimes fifty times that of a comparable weight cellulosic product. It is postulated that this striking increase in tear strength may depend on the presence of the relatively weak longitudinal channels in the sheets. Thus in a cross-lapped structure, a tear cannot be made to propagate very far in any direction without crossing one of the weak channels, and each time this occurs, the tear must effectively be re-initiated, which for such materials requires a higher force than that required for simple tear propagation.

Suitable bonding between the cross-lapped sheets may be achieved either by application of adhesive or by "self-bonding." Useful adhesives may be of several types such as pressure sensitive adhesives, e.g., "Formica" glue, and melt adhesives, e.g., "Elvax," or even branched polyethylene. Self-bonding can be achieved without any applied adhesive by pressing the cross-lapped polyhydrocarbon sheets at temperatures within a few degrees of the polymer melting point. The duration of heating should be held to a minimum to prevent appreciable relaxation of the polymer orientation in the cellular structure proper, since this leads to a degradation in physical properties. If a sufficient degree of bonding is not attained, these superior tear strengths are not observed, since the composite structures will fail by delamination rather than by tear propagation and reinitiation. In the preparation of cross-lapped structures, it is not necessary to first press the individual sheets. In fact, it is preferred to cross-lap the as-extruded sheets, coated with adhesive if desired, and press and bond them all in the same operation.

The cellular sheet products of this invention may also be subjected to a thermal annealing treatment comprising exposing the sample to a temperature between the glass transition temperature and the polymer crystalline melting point. Under these conditions a change in crystallite size occurs, the c-axis dimension becoming shorter while the transverse dimensions grow larger. Owing to the initial uniplanar orientation, this crystallite size change during annealing apparently requires that the polymer molecules contract from their original fully extended configuration (parallel to the cell wall surface) to assume a more normal folded chain configuration. This molecular rearrangement does not destroy the perfection of crystallite uniplanar orientation, but does create a tendency for each cell wall to contract in area during thermal annealing. Evidence tends to indicate that such is attended by a loss in uniformity in thickness of the film-like cell walls, at least on a micro-scale, as the crystallites seem to grow laterally—e.g., in the wall-thickness direction—at the expense of the quantity of polymer in the surrounding regions. As a consequence, a sample which is unrestrained during the annealing treatment is observed to shrink in size. However, if the cellular sheet is subjected to bilateral restraining forces (e.g., by clamping its edges or by heating between press platens), the tendency of the individual cell walls to contract during annealing sets up internal stresses in the sample. The results appear to be almost as if the sample had been bilaterally drawn: the cells collapse in the thickness-dimension of the sheet and the tensile properties of the sheet increase. Thus, annealing increases the initial modulus, tensile yield strength, and Clark Stiffness (TAPPI Test T-451) of either compressed or stretched sheets, thus further enhancing their utility, for example, as printing paper where low deformation and high stiffness are desirable. It appears that some rupturing of the cell walls, or perhaps some fusion of the juxtaposed cell wall faces, must also occur, as samples are annealed under restraint.

A special technique exists for producing a collapsed, bonded, balanced property cellular sheet in a continuous operation. If the cellular sheet is generated in blown tube form by extrusion through an annular die, the internal gas pressure between the die and a downstream nip/drawing roll assembly may be adjusted to a sufficiently high value to produce a lateral stretching of the tube by at least 1.5× beyond its normal expanded diameter. If the speed of the driven nip/drawing roll is adjusted to provide a simultaneous machine-direction drawing of at least 1.5×, the conditions for mutually perpendicular bilateral stretching are met, and a collapsed cellular product is produced directly. Furthermore, this product is observed to be "internally bonded," even though no external source of heat is applied. It appears that by collapsing the product in its freshly formed condition, sufficient residual activating liquid is present to plasticize the material so that internal bonding is achieved even at ambient temperatures.

The micro dimensions contribute several important features to these products, namely, the high opacity of the paper-like materials resulting from the efficient light scattering ability of the micro elements, and the ability to produce uniform sheets at extremely low basis weights, down to 0.1 oz./yd.$^2$. The discovery that the surfaces of the polyhydrocarbon sheet products are ink receptive directly as prepared is highly surprising in view of the hydrophobic nature of the polymer. The ink does not penetrate the sheets to any appreciable extent, nor does it run or smear into adjacent areas by capillary action. These sheets may be printed satisfactorily on ordinary letter press and lithography equipment, or even with commercial electrostatic photocopying equipment.

It is surprising that these cellular sheets consisting of polymeric elements which have already been oriented in the extrusion process and pressed can be further oriented by a drawing step. By this technique, paper-like products with tensile strengths as high as 61 lb./in.//oz./yd.$^2$ have been prepared.

As will be illustrated in greater detail in the examples which appear hereinafter, the collapsed sheet products of the invention have utility in a great variety of applications, whether they be used alone or in combination with other materials. The as-extruded or uncollapsed sheets also, of course, have many utilities directly as prepared. Particularly useful are those samples having a high percentage of closed cells which impart a pneumatic character to the sheets. Although the as-extruded sheets are ordinarily below ¼" in thickness, they may be laminated together to produce thicker structures, which may be made more or less flexible depending on whether the bonding is accomplished in discrete areas only, or over the full areas in contact. For certain application, e.g., in semi-textile products where higher breathability is desired, or in upholstery spring insulator pads where "drumming" is to be minimized, it is desirable to perforate these ultramicrocellular sheets with holes, either by cutting, melting, punching, needling, or other techniques known to those skilled in the art. When even lower density resilient materials are desired, these pneumatic cellular sheets may be lanced with slits and laterally extended to "open up" the apertures so that a given weight of cellular structure occupies an even larger "bulk volume." In any event, the collapsed sheet products of the present invention frequently constitute an excellent surfacing layer when laminated to an as-extruded ultramicrocellular sheet for the foregoing applications.

This invention is further illustrated by the following examples:

EXAMPLE I

A mixture of 1,000 grams of linear polyethylene (melt index equal 0.5), 750 cc. methylene chloride activating liquid, 135 grams chlorodifluoromethane, and 5 grams "Santocel" (Monsanto trademark for silica aerogel) as a nucleating agent was charged into a 3 liter stainless-steel pressure vessel. The contents were heated and mixed 6 hours at 150° C. to form a homogeneous solution. Prior to extrusion, the pressure vessel was connected to a source of nitrogen gas at a pressure of 450 p.s.i. Extrusion occurred through a 10 mil annular orifice 3 inches in diameter with a 0.0625" long parallel land at a velocity of approximately 500 y.p.m. The microcellular sheet product thus produced is in tubular form, approximately 10 inches in diameter, and exhibits longitudinal corrugation, presumably formed during the lateral expansion from the extrusion die. The optical thickness of the cell walls varies from 0.3 to 0.6 micron from the interior to the surface of the sheet. The thickness of polymer at intersections of cell walls is less than 1 micron, characteristic of a polyhedral walled multicellular structure. The cell size ranges from 100 to 200 microns. The polymer molecules in the cell walls are oriented parallel to the plane of the wall to within 10 degrees indicating a high degree of planar orientation. Electron diffraction indicates the 200 reflection is completely absent in most of the cell walls studied, indicating a high degree of uniplanar orientation. The polymer in the line of intersection of bubble walls shows a high degree of axial orientation along the direction of the intersection. The product prepared according to this example has a basis weight of 0.4 oz./yd.$^2$.

These microcellular sheets have a bulk density of 0.02 gram/cc. as spun. By applying pressure up to 500 p.s.i. to the face of these sheets for 1½ minutes at a temperature of 50° C. a range of sheet products of increased density up to 0.5 gram/cc. is obtained. These products have remarkably high strength in the machine direction of 22 lbs./in.//oz./yd.$^2$. The tensile strength in the transverse direction is only 4 lbs./in.//oz./yd.$^2$. When two such sheets are cross-lapped and bonded with adhesive (or self-bonded by pressing at temperatures near the polymer melting point), they form a composite with exceedingly high tear strength of 2 lbs.//oz./yd.$^2$ (about 20 to 50 times higher than ordinary cellulosic sheets) and tensile strengths as high as 30 lbs./in.//oz./yd.$^2$.

The lightly pressed cross-lapped sheet structures are leather-like in their suppleness, hand, and bending characteristics. They have been made into objects such as gloves, carrying cases, insulating bags, slippers and the like. It is possible to prepare such products exhibiting a range of water vapor transmission as desired in the range from about 1 to 60 grams/meter$^2$/24 hours by varying the proportion of open and closed cells by extruding closer to, or farther from the fibrillation line, shown as line (1) in FIGURES 10 and 11 of the Belgian patent.

The cross-lapped sheet products pressed at the higher pressures are paper-like, being light-weight, thin, flexible, and opaque. These properties plus their excellent tensile strength, tear resistance, and water insensitivity ideally suit these sheets for use as a premium bagging material. Another very interesting product useful as a carbonless copy paper or thermographic copy paper is produced when a colored adhesive is employed in the laminating step, or when a pressed microcellular sheet is laminated to one or both sides of a colored sheet. The color is ordinarily obscured by the opacity of the microcellular sheet. However, the color may be revealed in selected areas to form characters or patterns by selectively coalescing the overlying microcellular regions to destroy their opacity by application of heat or pressure. The heat generated in a thermographic copying process is adequate to effect such selected area clarification, and copies of suitable originals are readily prepared in commercial office thermographic equipment. Pressure coalescence and clarification of selected microcellular areas may be accomplished with a stylus or other means, as for example, the force exerted by the type face of a typewriter key. As many as eight clear legible copies of good contrast have been prepared simultaneously in a single typing on a stack of eight such laminated sheets. Ordinarily, a white opaque microcellular sheet with a dark colored adhesive, as may be prepared by mixing a pigment or a dye with any suitable adhesive, is preferred for such carbonless copy papers. However, other combinations are possible, for example, by preparing a colored microcellular sheet from a pigmented or dye containing polymer solution.

Incorporation of acicular particles such as potassium titanate will increase both bending stiffness and opacity of the microcellular products of this invention. For example, a cross lapped pressed sheet product is prepared as just described except that $K_2Ti_6O_{13}$ particles approximately half micron in diameter and 50 microns long are charged into the pressure vessel with the other ingredients. At a loading of 4.4%, based on the weight of the pressed microcellular sheet, an opacity of 92% is achieved at a basis weight of only 0.7 oz./yd.$^2$, while a control microcellular sheet containing no potassium titanate reaches 92% opacity only when the basis weight is raised to 1 oz./yd.$^2$. In further comparison a commercial clay-loaded cellulosic magazine paper achieves 92% opacity only for a basis weight of 1.8 oz./yd.$^2$. (Another microcellular sheet containing 5.8% of smaller potassium titanate particles exhibits an opacity of 92% at a basis weight of 0.4 oz./yd.$^2$.) For 1 oz./yd.$^2$ basis weight sheets, the potassium titanate reinforced sample has a Clark stiffness approximately twice that of the control. The stiffness of both these sheets increases by an additional factor of 2× upon being annealed at 126° C.

A microcellular sheet prepared according to the recipe of Example I at a basis weight of 0.3 oz./yd.$^2$ was pressed at 500 p.s.i. and cut into strips ¾" by 3" to serve as a backing material for pressure sensitive bandages. Several ½" slits were cut in the longitudinal direction in the center of the strips to impart breathability. This central area was then covered with a cheese cloth simulation of the gauze pads employed in commercial bandages. Two ¼" strips from the same pressed sheet material structure were cross lapped and laminated to the 3" strips at each end of the centrally located pad to provide additional strength and act as tear stoppers. The arms of the strip were coated with pressure sensitive adhesive. When desirable as an aid in application to complex shapes, the arms of the bandage may be torn into longitudinal strips up to the point of the cross lapped tear stopper strips. These bandages possess a balanced combination of ease of handling, stretching, conformability, leveling with the skin, skin folding characteristics, tension release due to creep, minimum loss of touch sensation, etc.

High strength light-weight ribbons or tapes may be prepared from pressed microcellular sheets by laminating strips to a parallel array of reinforcing cords. One such sample consisted of three layers of microcellular pressed sheets laminated parallel to a grid of nylon tire cords in parallel array at ⅛" spacing at a total basis weight of 4.6 oz./yd.$^2$, 63% of which was tire cord. This tape had a thickness of 45 mils and a tensile strength of 120 lbs./in., with elongation of 246%.

A similar laminated structure is prepared as follows: A microcellular sheet was prepared according to the recipe of Example I except that the quantities of chlorodifluoromethane and Santocel were 200 grams and 10 grams respectively. A sample of commercial nylon yarn (420–68–1–Z–300) having a tenacity of 7.9 grams/denier and 16% elongation was glued to the surface of this sheet in a parallel array of 10 ends per inch using a 1% solution of "Scotch Tape" glue in chloroform as an adhesive. Two sections of this material were cross lapped at 90° with their yarn surfaces in contact using an additional quantity of the same adhesive, and the composite structure was pressed at 400 p.s.i. and 50° C. for 1½ minutes. This laminated structure had a total basis weight of approximately 2 oz./yd.$^2$ and contained approximately equal weights of the microcellular sheet and nylon yarn. This laminated sheet was tested as a primary backing material for tufted rugs and carpets. Even after mock punching on a carpet tufting machine, it exhibited excellent properties of 97 pounds grab tensile and 23% elongation. These results were confirmed by tufting a sample with 501 nylon carpet yarn on commercial equipment, dyeing the sample, etc. Processing was satisfactory and the sample exhibited good properties. The microcellular sheet in this case serves as a convenient and inexpensive carrier for the non-woven grid of nylon yarns which give superior strength, dimensional stability, covering power and tuft holding capacity to the carpet backing material.

A bagging material is prepared in the same manner as above, except that a ¼" grid of zero twist 130 denier nylon having a tenacity of 6.3 grams/denier is used. The properties of this reinforced microcellular sheet are compared with those of a "control" of five plies of microcellular sheets (no reinforcing fibers, five plies chosen to obtain approximately equal basis weights) and a 50 pound kraft sample. Note the superiority of the reinforced microcellular sample in spite of its handicap of low basis weight

TABLE

| Sample | Basis Weight, oz./yd.$^2$ | Strip Tensile, lb. | Tear Propagation, lb. | Elongation, percent |
|---|---|---|---|---|
| Reinforced | 1.6 | 45 | 16.2 | 17 |
| Microcellular "Control" | 1.8 | 26 | 6.4 | 132 |
| 50 lb. kraft | 2.5 | 11 | $^1$ <3 | 2 |

$^1$ Too low to measure.

Pressed microcellular sheets are also useful as a surfacing material. They may be laminated to almost any substrate including metal, wood, cardboard, and impregnated non-woven fabrics as well as other types of fabrics such as knits, felts, wovens and non-wovens. A particularly interesting example is prepared by laminating four layers of microcellular sheets to one surface of a 16 mil vinyl film substrate. Two of the four layers were made using an annular die with a 10 mil gap, and the outer two layers were made using a 5 mil gap die. The total basis weight of the four plies was 2 oz./yd.$^2$. They were laminated to the vinyl film using Rhoplex AC 33 adhesive to produce a smooth surfaced structure 40 mils thick. This structure bears a remarkable resemblance to leather in many respects. First, like leather, mechanical working of this sheet develops a fine grained leather-like surface texture. The low heat conductivity of the microcellular surface leads to a neutral warm hand which is remarkably similar to leather, as is its response to sliding frictional forces, resistance to scuffing, and peeling behavior. These property similarities to leather may well be reflections of the structural similarities to the non-collapsed cellular surface layer of leather. The surface grain size referred to above may be controlled by varying the number and thickness of microcellular sheets, thickness of substrate, pressure during working, etc. In addition, these thermoplastic surfaces may readily be embossed with sharp clear images.

EXAMPLE II

The equipment of Example I was used and 1,000 grams of a copolymer of ethylene and 1-octene of density 0.937 (corresponding approximately to a 96/4 copolymer) and melt index of 0.54, 750 ml. of methylene chloride, 130 grams chlorodifluoromethane, and 5 grams Santocel were charged into the 3 liter pressure vessel. A solution of the copolymer was formed by heating the mixture to 150° C. for 7 hours. The autogenous pressure of 385 p.s.i.g. was increased to 405 p.s.i.g. just prior to extrusion by connecting the pressure vessel to a source of nitrogen. The microcellular copolymer sheet produced was cross-lapped using an adhesive (a commercial mixture of a wax plus a vinyl acetate/ethylene copolymer, "Elvax 250"), and pressed two minutes at 70° C. and 500 p.s.i. The resulting sheet of basis weight=1.3 oz./yd.$^2$, had tenacity=9.8 lbs./in.//oz./yd.$^2$, elongation=145%, modulus=42 lbs./in.//oz./yd.$^2$ and work-to-break=9.1 inch lbs./in.$^2$//oz./yd.$^2$.

EXAMPLE III

The mixture of Example I is modified by adding 61 grams more chlorodifluoromethane and 5 grams more Santocel. This increases the autogenous pressure of the spinning solution at 150° C. to 495 p.s.i.g. The 3 inch annular orifice is changed from a 10 mil gap to a 5 mil gap, and the solution is pressured with nitrogen to a total of 720 p.s.i.g. just prior to extrusion, which occurs at 160 y.p.m. The microcellular sheet thus produced has a tensile strength of 30 lbs./in.//oz./yd.$^2$ This is surprisingly high for a sheet whose basis weight is only 0.16±0.01 oz./yd.$^2$, since the normalized properties for sheet products generally fall off rapidly as the basis weight drops below 1 oz./yd.$^2$.

This sheet is cross-lapped and laminated using "Scotch Tape" glue, and pressed at 50° C. and 500 p.s.i. to form a composite sheet whose total basis weight equals 0.40 oz./yd.$^2$, tenacity=16.4 lbs./in.//oz./yd.$^2$, elongation=129%, modulus=30 lbs./in.//oz./yd.$^2$, work-to-break=13 inch lbs./in.$^2$//oz./yd.$^2$ and Elmendorf tear= 17.7 g.//g./m$^2$ (Tappi standard specimen size). These sheets are further remarkable in that the normalized water vapor transmission is not only the same for the single and crosslapped sheets, but also equivalent to that for polyethylene film. This indicates that even at this very low basis weight, these pressed microcellular sheets do not have pin holes or gross defects. This excellent uniformity at such low basis weight could only be attained by microcellular products of the present invention.

EXAMPLE IV

To a mixture of 50% linear polyethylene of melt index 0.9 and 50% pentane (Phillips "Pure Grade") was added 1.5% Santocel (based on polymer weight). This mixture was confined in a pressure vessel beneath a "floating" piston above which 900 p.s.i. of nitrogen pressure was applied, heated to 155° C., and extruded through a ¾" by 0.010" slot having an axial length of 0.015 inch. The product was a tape about four inches wide having a basis weight of 0.93 oz./yd.$^2$, a tensile strength of 23.5 lbs./in.//oz./yd.$^2$, elongation of 110%, modulus of 226 lbs./in//oz./yd.$^2$, and a work-to-break of 16.5 inch lbs./in.$^2$//oz./yd.$^2$. Although this product is substantially monolithic (i.e. not fibrillated or fractured into gross pieces), the conditions under which it was prepared are such as to cause rupture of substantial numbers of its microcells in such a way as to form interconnecting tunnels or channels or intercommunicating cells. This feature leads to a substantially non-pneumatic product while still retaining the excellent tensile properties reported above. The product exhibits a substantial degree of uniplanar orientation as indicated by less than half the normal electron diffraction intensity shown by certain reflections.

EXAMPLE V

A mixture of equal parts of linear polyethylene of melt index 0.75 and linear polypropylene of melt index 1.08 was prepared by melt blending the components in a screw extruder. 1,000 grams of the polymer blend, 750 cc. methylene chloride, 15 grams "Santocel," 170 grams of chlorodifluoromethane were charged into a pressure vessel. The mixture was heated six hours at 150° C. to form a spinning solution whose autogenous pressure of 450 p.s.i. was increased to 650 p.s.i. with nitrogen pressure just prior to extrusion through a three inch annular die with a 5 mil gap. The microcellular pneumatic sheet thus prepared exhibited desirable properties characteristic of each component. For example, the polyethylene component contributed a degree of drawability and fairly good transverse tensile properties to the sheet, while the polypropylene component contributed greater stiffness and higher temperature resistance than found for similar 100% linear polyethylene microcellular sheets. In fact, this product will withstand brief exposure to temperatures as high as 150° C. without melting, whereas the melting point of linear polyethylene is approximately 135° C. There was no indication of phase separation in the spinning solution, but the two polymers appear to have frozen out at different stages in the spinning operation, as might reasonably be expected from the 30° difference in their melting points. Although the microcellular sheet is an integral structure, it gives the visual impression of being composed of a network of fine strands of microcellular material dispersed throughout its volume and aligned parallel to the machine direction (presumably the polypropylene component) imbedded in a continuous microcellular matrix (presumably the polyethylene component).

EXAMPLE VI

A four-ply composite paper is prepared from sheets extruded as in Example III, cross lapped and laminated with Carter's Rubber Cement, and pressed at 300 p.s.i. at room temperature for 15 minutes. This 1 oz./yd.$^2$ paper is annealed in 20 p.s.i. steam to increase its stiffness by a factor of about two. It is printable employing both offset and letter press techniques. The type of ink used is not critical, but those which dry by oxidation, polymerization or solvent evaporation are preferred. The annealing step has no effect on the ink receptivity of the surface. The annealed sample cannot be post-inflated to its original low density.

EXAMPLE VII

A linear polyethylene sheet extruded as in Example I is drawn 2.2× on a hot bar heated to 135° C. The as-extruded tensile strength is 15 lb./in.//oz./yd.$^2$ which increases on drawing to 60.5 lb./in.//oz./yd.$^2$. The modulus shows an increase from 1.3 to 605 lb./in.//oz./yd.$^2$. All properties are measured in the machine direction. The hot drawing step results both in collapse of the structure to increase its density and in the formation of internal bonds.

The cross lapped drawn sheets have a tensile strength of 50 lb./in.//oz./yd.$^2$.

EXAMPLE VIII

A 1 oz./yd.$^2$ paper-like linear polyethylene pressed sheet is subjected to further pressing at 125° C. and 4,000 p.s.i. with an hexagonal faced die. The polyethylene sheet is separated from the lower press platen by a hard-pressed paper-maker's blotter. This operation forms a translucent hexagonal "window" in the opaque sheet. This sheet is then formed into a bag, the required seams being formed with a commercial ultrasonic sealing machine. The window in the face of the bag permits viewing its contents without opening the bag. This example demonstrates an application of this unique product utilizing its excellent tear and tensile strength and optional opacity or translucence.

EXAMPLE IX

A polypropylene sheet product is prepared according to the method of Example I using 1,000 g. of polypropylene of melt index 1.08, 750 cc. methylene chloride, 283 g. chlorodifluoromethane, and 20 g. of Santocel. The autogenous pressure at 150° C. of 520 p.s.i. was increased to 530 p.s.i. by nitrogen pressure just prior to extrusion through the 0.010" gap 3" annular die.

The following properties were measured on this product, each pair of numbers indicating the result as determined in the machine direction and transverse direction respectively:

| | Basis Wt. (oz./yd.$^2$) | Tensile Strength (lbs./in.// oz./yd.$^2$) | Work-to-Break (in.-lbs./ in.$^2$//oz./ yd.$^2$) | Elmendorf Tear (gm.//gm./m.$^2$) |
|---|---|---|---|---|
| As extruded | 1.0 | 7.3/1.0 | 1.7/0.3 | 1.5/--- |
| Pressed | 1.0 | 11.1/2.4 | 4.0/0.1 | 1.0/--- |
| Cross lapped | 2.5 | 8.3/7.8 | 2.0/1.6 | *1.7/2.0 |

*Delaminated.

EXAMPLE IX-A

Two polyethylene sheet products, A and B, prepared in a manner similar to Example I exhibit the following properties:

| | Basis Wt. (oz./yd.²) | Tensile Strength (lbs./in.// oz./yd.²) | Work-to-Break (in.-lbs./ in.²/oz./ yd.²) | Elmendorf Tear (gm.//gm./m.²) |
|---|---|---|---|---|
| A. As extruded | 0.6 | 12.9/1.7 | 4.4/0.6 | 0.96/— |
| Pressed | 0.6 | 25.3/2.3 | 18.7/0.2 | 1.4/— |
| Cross lapped | 1.1 | 9.3/10.2 | 5.1/7.2 | 8.8/2.7 |
| B. As extruded | 0.4 | 21.4/2.8 | 7.3/1.1 | 0.8/— |
| Pressed | 0.4 | 27.1/5.9 | 15.7/0.9 | 2.3/— |
| Cross lapped | 0.75 | 16.1/11.6 | 13.7/7.5 | 7.1/— |

EXAMPLE X

A polyethylene sheet product is prepared according to the method of Example I using 1000 grams of melt index 0.5 polymer, 750 cc. methylene chloride, 20 grams Santocel, and 191 grams of chlorodifluoromethane. The autogenous pressure of 435 p.s.i. was increased to 450 p.s.i. with nitrogen gas, and the product extruded at 130 y.p.m. through the 0.010″ die. The properties were as follows:

| | Basis Wt. (oz./yd.²) | Tensile (lbs./in.// oz./yd.²) | Work-to-Break (in.-lbs./in.²/ oz./yd.²) | Elmendorf Tear (g.//g./m.²) | Burst (TAPPI) | Vapor Transmission (g./m.²/day) | Fold Cycles | Spencer Puncture (in.-lbs./in.²) | Opacity (TAPPI), Percent |
|---|---|---|---|---|---|---|---|---|---|
| As extruded | 0.5 | 14.5/2.6 | 6.2/1.1 | 0.6/— | | | | | |
| Pressed | 0.5 | 18/4.7 | 13.1/0.9 | | | | | | |
| Cross lapped (self bonded) | 0.9 | 15.6/16.3 | 10.9/11.3 | 14.6/9.0 | 42 | 3.1 | >250,000 | 5.5 | 86 |
| Cross lapped (adhesive bonded) | 1.2 | 11.7/9.7 | 9.5/6.2 | 13.1/21 | 29 | 3.4 | >250,000 | 4.3 | 86 |

EXAMPLE XI

This example illustrates the production of a collapsed microcellular sheet employing a bilateral stretching process.

A 34% solution of linear polyethylene of melt index 0.5 was prepared by charging 74 g./minute of polymer, 96 g./minute of methylene chloride and 50 g./minute of chlorodifluoromethane to a heated 2″ extruder/mixer. The solution was accumulated in a 10 gallon pressure vessel and subsequently discharged at a temperature of 150° C. and superautogenous pressure of 550 p.s.i.g. through a 1.75″ diameter annular die having a 10 mil gap. The resulting foamed tube was extruded with a small positive internal pressure to inflate the tube and remove the longitudinal folds otherwise produced by lateral expansion during the foam generation. The tube was subsequently slit and opened into a sheet having a tensile strength of 13/4 lb./in.//oz./yd.², elongation of 179/124% and modulus of 18/6 lb./in.//oz./yd.² in the machine direction and transverse direction respectively.

A 4-ply cross-lapped laminate of this sheet was prepared employing Carter's Rubber Cement as the adhesive to yield a structure, Sample A, having a thickness of 0.065″ and density of 0.030 g./cc. The thickness of the film-like cell walls is 0.3 micron, and the average transverse cell diameter approximately 300 microns. The average cell-height may be computed from these data to be approximately 25 microns, indicating that the method of foam generation plus the slight mechanical pressure employed in the laminating step has apparently already produced some flattening of the cells.

Two portions of laminated Sample A were heated to 110° C. and stretched bilaterally simultaneously in two mutually perpendicular directions. The first portion was stretched 1.5× x 1.5× to produce Sample B and the second was stretched 2.0× x 2.0× to produce Sample C. The entries in the table below indicate how strikingly efficient this treatment is in further collapsing the cellular structure, as evidenced by the thickness decrease, density increase and cell height decrease.

| Sample | Drawn | Thickness, mils | Density, g./cc. | Av. Cell Width, microns | Cell Wall Thickness, microns | Av. Cell Height (calc.), microns |
|---|---|---|---|---|---|---|
| A | | 65 | 0.030 | 300 | 0.3 | 25 |
| B | 1.5× x 1.5× | 5 | 0.10 | 400 | 0.3 | 7 |
| C | 2.0× x 2.0× | 2 | 0.14 | 600 | 0.3 | 5 |

The stretch-collapsed Samples B and C have tensile strengths of 18 and 24 lb./in.//oz. yd.², elongation of 98 and 38%, and moduli of 151 and 157 lb./in.//oz./yd.² respectively, which may be compared with the much lower properties of the uncollapsed as-extruded sheet. In addition, Samples B and C exhibit a much higher surface luster than the uncollapsed (or even a pressure-collapsed) sample of the as-extruded ultramicrocellular sheet.

Microsocpic examination of these bilaterally-stretched examples indicates that there is a limit to the degree of compliance of the initially already highly-oriented individual film-like walls of the polyhedral cells. Thus, some of the cell walls, probably particularly those initially oriented approximately parallel to the direction of stretch, will have insufficient degrees of residual elongation and will be unable to survive the stretching operation intact. Some of these walls separate at their junction with adjacent cell walls while others undergo various types of failure by tearing throughout their area. However, even in Sample C where the extent of this type of "local failure" is more extensive due to the higher draw ratios employed, the over-all sheet structure is still intact and the net benefits of tilting the remaining load-bearing elements into the plane of the sheet is obvious from the improved tensile properties. Of course, as the bilateral-stretch-ratio is increased beyond 2×, the degree of internal damage becomes more and more severe, and eventually even the tensile properties of the whole sheet begin to fall off.

EXAMPLE XII

This example illustrates the increase in modulus of pressure-collapsed microcellular sheets on annealing.

A linear polyethylene microcellular sheet product was extruded in a manner similar to Example I by charging 1000 g. polymer containing 5% potassium titanate (in needle form 0.5 micron diameter by 50 microns long), 750 ml. methylene chloride and 137 g. chlorodifluoromethane into a 3 liter pressure vessel which was heated, the contents mixed, and the solution extruded at 150° C. and 500 p.s.i.g. through a 9 mil gap annular die. Two-ply cross-laminated portions of this ultramicrocellular sheet were compressed at 50° C. in a hydraulic press to densities of 0.14 g./cc. (Sample A) and 0.39 g./cc. (Sample B). Three portions of Samples A and B were then individually mounted between aluminum plates (separated by metal shims to maintain constant sample thickness) and annealed two minutes in steam at pressures of 15 p.s.i.g. (121° C.), 20 p.s.i.g. (126° C.) and 25 p.s.i.g. (130° C.). The modulus of the sample increases with increasing annealing temperature as follows: Set A, 37 (unannealed) 60, 86, 167 lb./in.//oz./yd.² and Set B, 74, 190, 210 and 300 lb./in.//oz./yd.².

EXAMPLE XIII

This example illustrates the increase in modulus of stretch-collapsed microcellular sheets on annealing.

A linear polyethylene microcellular sheet product was extruded in a manner similar to Example XI from a 46% polymer solution prepared at 170° C. from 106 parts polymer (melt index=0.5), 142 parts methylene chloride and 1.1 parts "Santocel" 54. The solution was held for one hour and then extruded at 150° C. and 700 p.s.i.g. to form an ultramicrocellular sheet product. A 4-ply cross-lapped laminate, prepared using Carter's Rubber Cement, was drawn bilaterally 1.5× x 1.5× at 100° C. to yield a stretch-collapsed cellular product. Portions of this sample were annealed between aluminum plates for two minutes in steam at various pressures. The modulus of these samples increased from 120 to 183 lb./in.//oz./yd.$^2$ as the steam pressure employed was increased from 16 p.s.i.g. (122° C.) to 30 p.s.i.g. (134.5° C.). The rigidity factor (TAPPI test T–451–M45) increased from 4.8 to 15.

EXAMPLE XIV

This example illustrates the production of a microcellular sheet which is collapsed by controlled stretching of the sheet upon extrusion.

Linear polyethylene of melt index 0.5 is fed to a heated 2″ Egan extruder provided with a 15/1 L/D screw followed by a 11/1 L/D mixing section. Methylene chloride is charged into the molten polymer stream at the entrance to the mixing section by a McCannimeter pump at a weight flow rate equal to that of the polymer. In addition, 1% by weight of "Santocel" 54 is provided as nucleating agent to assist bubble formation on subsequent extrusion. The 50% solution discharged from the mixing section is fed into a holding vessel under pressure, and its temperature is brought to 150° C. When temperature equilibrium is reached, a valve is opened to supply solution at a pressure of 300 p.s.i.g. to a 1.5″ diameter annular die of .005″ gap width with .010″ land length. The seamless cellular tube which is generated is led between pinch rolls driven at a surface speed of 125 y.p.m. Diffusion of methylene chloride vapor into the interior of the tube provides an internal super-atmospheric pressure which is regulated at approximately 5″ water gage pressure by bleeding off excess vapor through a tube, provided with a valve, which leads from the atmosphere to the center of the die. This internal pressure is sufficient to expand the tube to a diameter of 6.7″. The enforced longitudinal and lateral drawing imposed by the lateral expansion and driven pinch rolls provides a sheet weighing 0.14 oz./yd.$^2$ contrasted with a (pleat-free) free-fall sheet weighing 0.3 oz./yd.$^2$. In addition to reducing the sheet by a factor of 2, the biaxial drawing produces a 10 fold denser collapsed-cell product of density 0.18 g./cc. compared with a density of 0.018 g./cc. for the free-fall product.

EXAMPLE XV

A linear polyethylene collapsed-cell sheet is extruded in a process similar to Example XIV except that the activating liquid is fluorotrichloromethane, the solution concentration is 50%, 0.75 percent "Santocel" is used, the extrusion temperature is 145° C., the extrusion pressure is 300 p.s.i.g., the annular extrusion die has a .010″ gap and a .020″ land, the pinch roll surface speed is 110 y.p.m. and the tube is expanded laterally by the super-atmospheric internal pressure by a factor of 7.2×. This biaxially stretched tubular product has a weight of 0.27 oz./yd.$^2$ and a density of 0.28 g./cc., indicative of its highly collapsed state as compared with 0.45 oz./yd.$^2$ and 0.02 g./cc. for the free-fall product.

Separate portions of the collapsed sheet are annealed for one minute in steam at temperatures of 124 and 130° C. to produce even higher degrees of internal bonding as indicated by the following properties:

|  | Annealing Treatment (1 minute in steam) | | |
|---|---|---|---|
|  | None | 124° C. | 130° C. |
| Sheet wt. (oz./yd.$^2$) | 0.27 | .28 | .27 |
| Opacity (percent) | 60 | 50 | 39 |
| Sheet Density (g./cc.) | 0.28 | 0.26 | 0.32 |
| Tensile St. (lbs./in.//oz./yd.$^2$): | | | |
| MD | 8.4 | 10.0 | 9.7 |
| TD | 7.7 | 8.3 | 8.5 |
| Elongation (percent): | | | |
| MD | 72 | 73 | 74 |
| TD | 28 | 20 | 17 |
| Initial Modulus (lbs./in.//oz./yd.$^2$): | | | |
| MD | 60 | 175 | 200 |
| TD | 60 | 140 | 240 |
| Force at 5% Elongation (lbs./in.//oz./yd.$^2$): | | | |
| MD | 2.3 | 4.2 | 4.6 |
| TD | 2.5 | 4.5 | 5.6 |

For comparison, the initial modulus and force at 5% elongation (a measure of stiffness) for low density uncollapsed, unbonded, free-fall products is approximately 15 lb./in.//oz./yd.$^2$ and 0.6 lb./in.//oz./yd.$^2$.

What is claimed is:

1. An integral sheet of a crystalline hydrocarbon polymer comprising flattened polyhedral shaped cells whose walls have an average film thickness below 2 microns, possess uniplanar orientation and are aligned substantially within the plane of the sheet.

2. The sheet product of claim 1 wherein the smallest dimension of the polyhedral shaped cells averages less than 50 microns and the second largest dimension of the polyhedral shaped cells averages less than 3000 microns but at least 3 times the smallest dimension.

3. The product of claim 1 wherein the hydrocarbon polymer is polyethylene.

4. The product of claim 1 wherein the hydrocarbon polymer is polypropylene.

5. The product of claim 1 wherein the hydrocarbon polymer is selected from the class consisting of linear polyethylene, polypropylene, and crystallizable copolymers and graft polymers of ethylene and propylene with 1-olefins of up to ten atoms.

6. The sheet product of claim 1 containing acicular potassium titanate uniformly distributed therethrough.

7. The sheet of claim 1 adhesively bonded to fibrous reinforcing elements.

8. A cross-lapped product having at least two bonded plies of cellular sheets whose machine directions are at angles greater than 30° to each other, the cellular sheets being integral structures of a crystalline hydrocarbon polymer comprising flattened polyhedral shaped cells whose walls have an average film thickness below 2 microns, possess uniplanar orientation, and are aligned substantially within the plane of the sheet.

9. A process for preparing paper-like and semi-textile-like structures which comprises compressing beyond its yield point to a thickness less than one-third its original thickness, an integral, crystalline ultramicrocellular sheet material composed of a hydrocarbon polymer, substantially all of the polymer in said sheet material being present as filmy elements of a thickness less than 2 microns with the polymer in the cell walls exhibiting uniplanar orientation and a uniform texture.

10. The process of claim 9 wherein the pressing is carried out at temperatures below the crystalline melting point of the polymer.

11. The process of claim 9 wherein the hydrocarbon polymer is polyethylene.

12. The process of claim 9 wherein the hydrocarbon polymer is polypropylene.

13. The process of claim 9 wherein the step of compressing is followed by subjecting the thickness reduced sheet to bilateral restraining forces while heating it to a temperature between the glass transition temperature and crystalline melting point of the polymer.

14. A process for preparing paper-like and semi-textile-like structures which comprises bilaterally stretching, beyond its yield point to a thickness less than one-third its original thickness, an integral, crystalline ultramicrocellular sheet material composed of a hydrocarbon polymer, substantially all of the polymer in said sheet material being present as filmy elements of a thickness less than 2 microns, with the polymer in the cell walls exhibiting uniplanar orientation and a uniform texture.

15. The process of claim 14 wherein the bilateral stretching is carried out at temperatures below the crystalline melting point of the polymer.

16. The process of claim 14 wherein the hydrocarbon polymer is polyethylene.

17. The process of claim 14 wherein the hydrocarbon polymer is polypropylene.

18. The process of claim 14 wherein the bilateral stretching is effected to stretch the sheet material to at least about 150% of its initial larger dimensions in two mutually perpendicular directions.

19. The process of claim 14 wherein the step of bilateral stretching is followed by subjecting the thickness reduced sheet to bilateral restraining forces while heating it to a temperature between the glass transition temperature and crystalline melting point of the polymer.

References Cited

UNITED STATES PATENTS

| | | | |
|---|---|---|---|
| 2,841,470 | 7/1958 | Berry | 252—62 X |
| 2,877,500 | 3/1959 | Rainer et al. | 264—22 |
| 3,003,304 | 10/1961 | Rasmussen | 156—229 X |
| 3,022,541 | 2/1962 | Passley et al. | 264—291 |
| 3,050,432 | 8/1962 | Weinbrenner et al. | 156—196 |
| 3,072,584 | 1/1963 | Karpovich | 264—53 X |
| 3,104,192 | 9/1963 | Hacklander | 156—209 |

FOREIGN PATENTS

| | | |
|---|---|---|
| 911,995 | 12/1962 | Great Britain. |
| 1,270,540 | 7/1961 | France. |

EARL M. BERGERT, *Primary Examiner.*

H. F. EPSTEIN, *Assistant Examiner.*